United States Patent
Yang

(10) Patent No.: US 11,974,178 B2
(45) Date of Patent: Apr. 30, 2024

(54) CELL HANDOVER METHOD, DEVICE AND READABLE STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 584 days.

(21) Appl. No.: 17/273,021

(22) PCT Filed: Sep. 4, 2018

(86) PCT No.: PCT/CN2018/103988
§ 371 (c)(1),
(2) Date: Mar. 3, 2021

(87) PCT Pub. No.: WO2020/047747
PCT Pub. Date: Mar. 12, 2020

(65) Prior Publication Data
US 2021/0321308 A1   Oct. 14, 2021

(51) Int. Cl.
*H04W 12/037* (2021.01)
*H04W 12/106* (2021.01)
*H04W 36/00* (2009.01)

(52) U.S. Cl.
CPC ..... *H04W 36/0072* (2013.01); *H04W 12/037* (2021.01); *H04W 12/106* (2021.01); *H04W 36/0069* (2018.08); *H04W 36/00835* (2018.08)

(58) Field of Classification Search
CPC . H04W 12/03; H04W 12/033; H04W 12/037; H04W 12/10; H04W 12/106;
(Continued)

(56) References Cited

U.S. PATENT DOCUMENTS 8,320,333 B2 * 11/2012 Mildh ................. H04W 56/001
370/350
8,909,227 B2   12/2014 Kitazoe et al.
(Continued)

FOREIGN PATENT DOCUMENTS

CN   101523951 A   9/2009
CN   101646212 A   2/2010
(Continued)

OTHER PUBLICATIONS

Indian Office Action dated Feb. 3, 2022 in Indian Patent Application No. 202147013484, 5 pages.
(Continued)

*Primary Examiner* — Matthew W Genack
(74) *Attorney, Agent, or Firm* — Oblon, McClelland, Maier & Neustadt, L.L.P.

(57) ABSTRACT

Aspect of the disclosure are directed to a method that can include receiving a handover instruction and time sequence relationship sent by a base station. The handover instruction being used for indicating a terminal switching to one from among at least two target cells, and the time sequence relationship being used for indicating whether any two cells among the at least two target cells are synchronized in time slot. The method can further include synchronizing with a first cell among the at least two target cells initiating handover to the first cell according to the synchronization result with the first cell, and determining a second cell among the at least two target cells after handover fails, the second cell being synchronized in time slot with the first cell, and initiating connection reconstruction to the second cell according to the synchronization result with the first cell.

12 Claims, 7 Drawing Sheets

(58) Field of Classification Search
CPC ......... H04W 36/0005; H04W 36/0055; H04W 36/0058; H04W 36/0069; H04W 36/0072; H04W 36/0083; H04W 36/00835; H04W 36/00837; H04W 36/00838; H04W 36/0085; H04W 36/0088; H04W 36/0094
See application file for complete search history.

(56) References Cited

U.S. PATENT DOCUMENTS

| | | |
|---|---|---|
| 2010/0165850 A1 | 7/2010 | Grob-Lipski et al. |
| 2010/0178920 A1 | 7/2010 | Kitazoe et al. |
| 2013/0029694 A1 | 1/2013 | Fong et al. |
| 2013/0329694 A1 | 12/2013 | Vrzic et al. |
| 2014/0038605 A1* | 2/2014 | Behnamfar ....... H04W 36/0061 455/436 |
| 2014/0335861 A1 | 11/2014 | De Benedittis et al. |
| 2015/0181470 A1 | 6/2015 | Chai et al. |
| 2016/0157194 A1 | 6/2016 | Svedman et al. |
| 2017/0078990 A1 | 3/2017 | Chu et al. |
| 2017/0164245 A1 | 6/2017 | Chai et al. |
| 2018/0049073 A1 | 2/2018 | Dinan et al. |
| 2018/0175922 A1 | 6/2018 | Nishimori et al. |
| 2018/0255487 A1 | 9/2018 | Chai et al. |
| 2019/0274075 A1 | 9/2019 | Chai et al. |

FOREIGN PATENT DOCUMENTS

| | | |
|---|---|---|
| CN | 103716080 A | 4/2014 |
| CN | 105472670 A | 4/2016 |
| CN | 105684514 A | 6/2016 |
| CN | 105981454 A | 9/2016 |
| CN | 107005955 A | 8/2017 |
| CN | 107690163 A | 2/2018 |
| EP | 2 205 021 A1 | 7/2010 |
| EP | 2 876 932 A1 | 5/2015 |
| EP | 3 142 430 A1 | 3/2017 |
| GB | 2318938 | 5/1998 |
| WO | WO 2014/198026 A1 | 12/2014 |
| WO | WO 2015/013208 A1 | 1/2015 |
| WO | WO 2017/024452 A1 | 2/2017 |

OTHER PUBLICATIONS

Extended European Search Report dated Mar. 28, 2022 in European Patent Application No. 18932525.1, 13 pages.
International Search Report and Written Opinion dated May 27, 2019 in PCT/CN2018/103988 filed Sep. 4, 2018, 6 pages.
Combined Chinese Office Action and Search Report dated Jul. 23, 2020 in Patent Application No. 201880001252.2 (with English language translation), 12 pages.
NTT DOCOMO, Inc., "Remaining issues on NR-PBCH," 3GPP TSG RAN WG1 Meeting #92bis, R1-1805032, Apr. 2018, 4 pages.
Chinese National Intellectual Property Administration, Jul. 22, 2022, Office Action in Application No. 202111170309.1.
Korean Intellectual Property Office, Mar. 31, 2022, Office Action in Application No. 10-2018-0130805.

* cited by examiner

CELL HANDOVER METHOD, DEVICE AND READABLE STORAGE MEDIUM

RELATED APPLICATION

This application claims the benefit of International Application No. PCT/CN2018/103988, entitled "CELL HANDOVER METHOD, DEVICE AND READABLE STORAGE MEDIUM" and filed on Sep. 4, 2018, which is incorporated herein by reference in its entirety.

TECHNICAL FIELD

The present disclosure generally relates to the wireless communication technology, including to a method and apparatus for cell handover and a storage medium.

BACKGROUND

When a terminal is moved from one cell to another cell, handover of the cell that the terminal is connected to is performed in order to avoid communication interruption of the mobile user. During a connection process between a terminal and a cell, the terminal further performs measurement on other nearby cells and reports the measurement results to a base station corresponding to a currently connected cell. When the base station determines that the terminal needs a cell handover according to the measurement results reported by the terminal, the base station transmits a handover command to the terminal. The handover command indicates a target cell to which the terminal can perform a handover, and the terminal initiates the handover procedure to the target cell according to the handover command.

SUMMARY

A method and apparatus for cell handover and a computer-readable storage medium are provided by the present disclosure.

According to a first aspect of the disclosure, a method for cell handover executed by a terminal is provided. The method can include receiving a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, and the time slot synchronization indicates that time-domain resources for synchronization signals for the two cells are the same. Additionally, the method can include performing synchronization with a first cell of the at least two target cells, and determining a second cell from the at least two target cells, in response to initiation of a handover to the first cell, according to a result of the synchronization with the first cell and failure of the handover, wherein the second cell is in slot synchronization with the first cell. Further, the method can include initiating a connection reestablishment to the second cell according to the result of the synchronization with the first cell.

Alternatively, the timing sequence relationship is further configured to indicate whether any two cells of the at least two target cells have a same hyper frame number (HFN). Initiating the connection reestablishment to the second cell according to the result of the synchronization with the first cell can include acquiring an HFN of the first cell, in response to that the timing sequence relationship indicates that the HFN of the first cell and an HFN of the second cell are the same, wherein the HFN of the first cell is acquired during a process of performing synchronization with the first cell, and performing encryption and integrity protection for a reconfiguration complete message to be transmitted to the second cell through the HFN of the first cell, when transmitting the reconfiguration complete message to the second cell.

Alternatively, determining the second cell from the at least two target cells can include acquiring a set of candidate cells according to the timing sequence relationship, wherein the set of candidate cells comprise one or more cells in the at least two target cells, which are in slot synchronization with the first cell, and to which the terminal has not initiated a connection reestablishment yet, and determining the second cell from the set of candidate cells according to a predetermined selection rule, in response to that the set of candidate cells comprise at least two cells.

Alternatively, determining the second cell from the set of candidate cells according to the predetermined selection rule, can include determining a cell from the set of candidate cells as the second cell randomly, or determining a cell with a strongest signal strength among the set of candidate cells as the second cell, or determining a cell supporting a service type as the same as that corresponding to the terminal among the set of candidate cells as the second cell.

Alternatively, initiating the connection reestablishment to the second cell according to the result of the synchronization with the first cell can include performing signal measurement on the second cell to acquire a signal measurement result, wherein the signal measurement result comprises at least one of a reference signal receiving power (RSRP) or a reference signal receiving quality (RSRQ), and initiating the connection reestablishment to the second cell according to the result of the synchronization with the first cell, in response to that the signal measurement result is no lower than a predetermined measurement result threshold According to a second aspect of embodiments of the present disclosure, there is provided a method for cell handover, executed by a terminal. The method can include receiving a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, wherein the time slot synchronization indicates that time-domain resources for synchronization signals for the two cells are the same. The method can further include, for each set of cells in slot synchronization with each other among the at least two target cells, selecting a respective cell from the set of cells in slot synchronization as a synchronization cell, and performing synchronization with each of the selected synchronization cell. Additionally, the method can include acquiring a result of the synchronization with a fourth cell, when initiating a handover to a third cell of the at least two target cells, wherein the fourth cell is a synchronization cell in slot synchronization with the third cell, and initiating the handover to the third cell according to the result of the synchronization with the fourth cell.

Alternatively, the timing sequence relationship is further configured to indicate whether any two cells of the at least two target cells have a same hyper frame number (HFN). Initiating the handover to the third cell according to the result of the synchronization with the fourth cell, can include acquiring an HFN of the fourth cell, in response to that the timing sequence relationship indicates that an HFN of the third cell and the HFN of the fourth cell are the same, wherein the HFN of the fourth cell is acquired during a process of performing synchronization with the fourth cell. The method can further include performing encryption and integrity protection for a reconfiguration complete message to be transmitted to the third cell through the HFN of the fourth cell, in response to transmitting the reconfiguration complete message to the third cell.

Alternatively, the method further includes determining a fifth cell from the at least two target cells, after initiation of a handover to the third cell and failure of the handover, wherein the fifth cell is in slot synchronization with the fourth cell, and initiating a connection reestablishment to the fifth cell according to the result of the synchronization with the fourth cell.

According to a third aspect of embodiments of the present disclosure, there is provided a method for cell handover, executed by a base station. The method can include generating a handover command, wherein the handover command is configured to instruct a terminal to perform a handover to one of at least two target cells, and generating a timing sequence relationship, wherein the timing sequence relationship is configured to indicate whether any two cells of the at least two target cells are in slot synchronization with each other, wherein the slot synchronization indicates that time-domain resources for synchronization signals for the two cells are the same. The method can further include transmitting the handover command and the timing sequence relationship to the terminal.

Alternatively, the generating the timing sequence relationship can include acquiring time-domain resource offset information of each of the at least two target cells, wherein for each of the at least two target cells, the time-domain resource offset information is configured to indicate a time-domain offset value between time-domain resource for the target cell and time-domain resource for the cell accessed by the terminal currently, and generating the timing sequence relationship according to the time-domain resource offset information of the each of the at least two target cells.

Alternatively, the timing sequence relationship is further configured to indicate whether any two cells of the at least two target cells have a same hyper frame number (HFN).

According to a fourth aspect of embodiments of the present disclosure, there is provided an apparatus for cell handover, applied to a terminal, the apparatus can include receiving module that is configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, and the time slot synchronization indicates that time-domain resources for synchronization signals for the two cells are the same. The method can further include synchronization module that is configured to perform synchronization with a first cell of the at least two target cells, and a cell determination module that is configured to determine a second cell from the at least two target cells, in response to initiation of a handover to the first cell according to a result of the synchronization with the first cell and failure of the handover, wherein the second cell is in slot synchronization with the first cell. Additionally, the method can include a reestablishment module that is configured to initiate a connection reestablishment to the second cell according to the result of the synchronization with the first cell.

Alternatively, the timing sequence relationship is further configured to indicate whether any two cells of the at least two target cells have a same hyper frame number (HFN). The reestablishment module can be further configured to acquire an HFN of the first cell, in response to that the timing sequence relationship indicates that the HFN of the first cell and an HFN of the second cell are the same, wherein the HFN of the first cell is acquired during a process of performing synchronization with the first cell, and perform encryption and integrity protection for a reconfiguration complete message to be transmitted to the second cell through the HFN of the first cell, in response to transmitting the reconfiguration complete message to the second cell.

Alternatively, the cell determination module is further configured to acquire a set of candidate cells according to the timing sequence relationship, wherein the set of candidate cells comprise one or more cells in the at least two target cells, which are in slot synchronization with the first cell, and to which the terminal has not initiated the connection reestablishment yet, and determine the second cell from the set of candidate cells according to a predetermined selection rule, in response to that the set of candidate cells comprise at least two cells.

Alternatively, in response to that the second cell is determined from the set of candidate cells according to the predetermined selection rule, the cell determination module is further configured to determine a cell from the set of candidate cells as the second cell randomly, or determine a cell with a strongest signal strength among the set of candidate cells as the second cell, or determine a cell supporting a service type as the same as that corresponding to the terminal among the set of candidate cells as the second cell.

Alternatively, the reestablishment module is further configured to perform signal measurement on the second cell to acquire a signal measurement result, wherein the signal measurement result comprises at least one of a reference signal receiving power (RSRP) or a reference signal receiving quality (RSRQ), and initiate the connection reestablishment to the second cell according to the result of the synchronization with the first cell, in response to that the signal measurement result is no lower than a predetermined measurement result threshold.

According to a fifth aspect of embodiments of the present disclosure, there is provided an apparatus for cell handover, applied to a terminal. The apparatus can include a receiving module that is configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, wherein the time slot synchronization indicates that time-domain resources for synchronization signals for the two cells are the same. The apparatus can further include a cell selection module that is configured to for each set of cells in slot synchronization with each other among the at least two target cells, select a respective cell from the set of cells in slot synchronization as a synchronization cell, and a synchronization module that is configured to perform synchronization with each of the selected synchronization cell. Additionally, the apparatus can include a result acquisition module that is configured to acquire a result of the synchronization with a fourth cell, when initiating a handover to a third cell of the at least two target cells, wherein the fourth cell is a synchronization cell in slot synchronization with the third cell, and a handover module that is configured to initiate the handover to the third cell according to the result of the synchronization with the fourth cell.

Alternatively, the timing sequence relationship is further configured to indicate whether any two cells of the at least two target cells have a same hyper frame number (HFN). The handover module is further configured to acquire an HFN of the fourth cell, in response to that the timing sequence relationship indicates that an HFN of the third cell and the HFN of the fourth cell are the same, wherein the HFN of the fourth cell is acquired during a process of performing synchronization with the fourth cell, and perform encryption and integrity protection for a reconfiguration complete message to be transmitted to the third cell through the HFN of the fourth cell, in response to transmitting the reconfiguration complete message to the third cell.

Alternatively, the apparatus further includes a cell determination module that is configured to determine a fifth cell from the at least two target cells, after initiation of a handover to the third cell and failure of the handover, wherein the fifth cell is in slot synchronization with the fourth cell, and a reestablishment module that is configured to initiate a connection reestablishment to the fifth cell according to the result of the synchronization with the fourth cell.

According to a sixth aspect of embodiments of the present disclosure, there is provided an apparatus for cell handover that is applied to a base station. The apparatus can include an instruction generation module that is configured to generate a handover command, wherein the handover command is configured to instruct a terminal to perform a handover to one of at least two target cells, a relationship generation module that is configured to generate a timing sequence relationship, wherein the timing sequence relationship is configured to indicate whether any two cells of the at least two target cells are in slot synchronization with each other, wherein the slot synchronization indicates that time-domain resources for synchronization signals for the two cells are the same, and a transmitting module that is configured to send the handover command and the timing sequence relationship to the terminal.

Alternatively, the relationship generation module is further configured to acquire time-domain resource offset information of each of the at least two target cells, wherein for each of the at least two target cells, the time-domain resource offset information is configured to indicate a time-domain offset value between time-domain resource for the target cell and time-domain resource for the cell accessed by the terminal currently, and generate the timing sequence relationship according to the time-domain resource offset information of the each of the at least two target cells. Alternatively, the timing sequence relationship is further configured to indicate whether any two cells of the at least two target cells have a same hyper frame number (HFN).

According to a seventh aspect of the disclosure, there is provided a system for cell handover, the system includes a terminal and a base station. The terminal includes the apparatus for cell handover according to the foregoing fourth aspect or any optional implementation manner of the fourth aspect. The base station includes the apparatus for cell handover according to the foregoing sixth aspect or any optional implementation manner of the sixth aspect. Alternatively, the terminal includes the apparatus for cell handover according to the foregoing fifth aspect or any optional implementation manner of the fifth aspect. The base station includes the apparatus for cell handover according to the foregoing sixth aspect or any optional implementation manner of the sixth aspect.

According to an eighth aspect of the disclosure, there is provided an apparatus for cell handover, applied to a terminal. The apparatus includes a processor and a memory for storing a computer program executable by the processor. The processor can be configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, and the time slot synchronization indicates that time-domain resources for synchronization signals for the two cells are the same. Further, the processor can be configure to perform synchronization with a first cell of the at least two target cells, determine a second cell from the at least two target cells, in response to initiation of a handover to the first cell according to a result of the synchronization with the first cell and failure of the handover, wherein the second cell is in slot synchronization with the first cell, and initiate a connection reestablishment to the second cell according to the result of the synchronization with the first cell.

According to a ninth aspect of the disclosure, there is provided an apparatus for cell handover that is applied to a terminal. The apparatus can include a processor and a memory for storing a computer program executable by the processor. The processor can be configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, wherein the time slot synchronization indicates that time-domain resources for synchronization signals for the two cells are the same. The processor can be further configured to, for each set of cells in slot synchronization with each other among the at least two target cells, select a respective cell from the set of cells in slot synchronization as a synchronization cell, perform synchronization with each of the selected synchronization cell, acquire a result of the synchronization with a fourth cell, when initiating a handover to a third cell of the at least two target cells, wherein the fourth cell is a synchronization cell in slot synchronization with the third cell, and initiate the handover to the third cell according to the result of the synchronization with the fourth cell.

According to a tenth aspect of the disclosure, there is provided an apparatus for cell handover that is applied to a terminal. The apparatus can include a processor and a memory for storing a computer program executable by the processor, The processor is configured to generate a handover command, wherein the handover command is configured to instruct a terminal to perform a handover to one of at least two target cells, generate a timing sequence relationship, wherein the timing sequence relationship is configured to indicate whether any two cells of the at least two target cells are in slot synchronization with each other, wherein the slot synchronization indicates that time-domain resources for synchronization signals for the two cells are the same, and send the handover command and the timing sequence relationship to the terminal.

According to a eleventh aspect of the disclosure, there is provided a non-transitory computer-readable storage medium, having stored thereon computer executable instructions that, when executed by a processor of a terminal, cause operations of the method according to the foregoing fourth aspect or any optional implementation manner of the fourth aspect to be performed.

According to a twelfth aspect of the disclosure, there is provided a non-transitory computer-readable storage medium, having stored thereon computer executable instructions that, when executed by a processor of a terminal, cause operations of the method according to the foregoing fifth aspect or any optional implementation manner of the fifth aspect to be performed.

According to a thirteenth aspect of the disclosure, there is provided a non-transitory computer-readable storage medium, having stored thereon computer executable instructions that, when executed by a processor of a terminal, cause operations of the method according to the foregoing sixth aspect or any optional implementation manner of the sixth aspect to be performed.

The technical solutions provided by the embodiments of the present disclosure includes beneficial effects. For example, when a terminal receives a handover command indicating at least two target cells from a base station, the terminal also receives a timing sequence relationship indicating whether the at least two target cells are in slot synchronization with each other. During the subsequent process of cell handover, in response to initiation of a handover to the first cell and failure of the handover, the terminal may preferentially select a second cell which is in slot synchronization with the first cell, for initiating connection reestablishment. Thus, the terminal may omit the synchronization step in the reestablishment process to shorten the time required for the reestablishment process, so as to reduce time delay and service interruption caused by the synchronization in the cell handover or the reestablishment process, thereby improving efficiency of the cell handover and system communication performance.

It is to be understood that the above general description and detailed description below are only exemplary and explanatory, and are not intended to limit the present disclosure.

BRIEF DESCRIPTION OF THE DRAWINGS

The accompanying drawings, which are incorporated in and constitute a part of this specification, illustrate exemplary embodiments consistent with the invention and, together with the description, serve to explain the principles of the invention.

DETAILED DESCRIPTION

Figure 1:
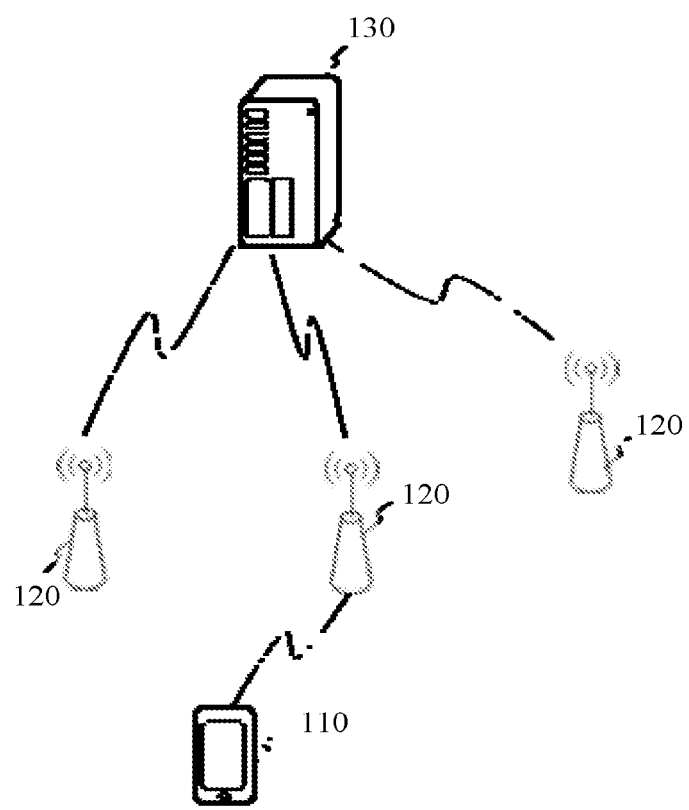
FIG. 1 illustrates a schematic structural diagram of a wireless communication system according to some exemplary embodiments.

The exemplary embodiments of the present disclosure are described in detail herein, and their examples are illustrated in the drawings. When the following description refers to the drawings, the same numbers in different drawings represent the same or similar elements unless otherwise indicated. The implementations described in the following exemplary embodiments do not represent all implementations consistent with the present disclosure. On the contrary, they are merely examples of apparatuses and methods consistent with some aspects of the present disclosure, as detailed in the appended claims.

It should be understood that "some" mentioned in the present disclosure refers to one or more, and "a plurality of" refers to two or more. "And/or" describes the association relationship of the associated objects, indicating that there can be three types of relationships. For example, A and/or B can indicate the following cases: A exists alone, A and B exist at the same time, and B exists alone. The character "/" generally indicates that the associated objects are in an "or" relationship.

How to successfully and quickly complete the cell handover is one of the key points of a wireless communication system design. The embodiments of the present disclosure provide a solution for cell handover, which can be applied to a wireless communication system to implement a fast handover for a terminal from one cell to another cell.

FIG. 1 illustrates a schematic structural diagram of a wireless communication system according to some exemplary embodiments. As shown in FIG. 1, the wireless communication system may include several terminals 110 and several base stations 120.

Herein, a terminal 110 may be a device that provides voice and/or data connectivity to a user. The terminal 110 may communicate with one or more core networks through a Radio Access Network (RAN). The terminal 110 may be a mobile terminal, such as a mobile phone (or "cellular" phone) and a computer with a mobile terminal, for example, a mobile device that may be portable, pocket, handheld, computer built-in or vehicle mounted, for example, a STAtion (STA), a subscriber unit, a subscriber station, a mobile station, a mobile, a remote station, an access point, a remote terminal, an access terminal, a user terminal and a user agent, a user device, or a User Equipment (UE). Or, the terminal 110 may be a device of an unmanned aerial vehicle.

The base station 120 may be a network side device in the wireless communication system. Herein, the wireless communication system may be the 4th Generation (4G) mobile communication system, also known as the Long Term Evolution (LTE) system. Or, the wireless communication system may be the 5G system, also known as the New Radio (NR) system. Or, the wireless communication system may be the next generation of the 5G system.

Herein, a base station 120 may be an evolved base station (eNB) used in the 4G system. Or, the base station 120 may be a base station with a central-distributed architecture (gNB) in the 5G system. When the base station 120 adopts the central-distributed architecture, it usually includes a Central Unit (CU) and at least two Distributed Units (DUs). The central unit may be configured with a Packet Data Convergence Protocol (PDCP) layer, a Radio Link Control (RLC) layer, and a Media Access Control (MAC) layer. The distributed units may be configured with a protocol stack of PHYsical (PHY) layer. The embodiments of the present disclosure do not limit the specific implementation manner of the base station 120.

A wireless connection between the base station 120 and the terminal 110 may be established via a wireless air interface. In different embodiments, the wireless air interface may be a wireless air interface based on the 4th generation mobile communication network technology (4G) standard. Or, the wireless air interface may be a wireless air interface based on the 5th Generation (5G) mobile communication network technology standard, for example, a New Radio. Or, the wireless air interface may also be a wireless air interface based on 5G-based next generation mobile communication network technology standard. Alternatively, the wireless communication system may also include a network management device 130.

Several base stations 120 are connected to the network management device 130. Herein, the network management device 130 may be a core network device in the wireless communication system. For example, the network management device 130 may be a Mobility Management Entity (MME) in an Evolved Packet Core (EPC) network. Or, the network management device 130 may be other core network devices, such as a Serving GateWay (SGW), a Public Data Network GateWay (PGW), a Policy and Charging Rules Function (PCRF) unit, or a Home Subscriber Server (HSS). The embodiment of the present disclosure does not limit the implementation form of the network management device 130.

Herein, the aforementioned several base stations 120 may include a first base station and a second base station. When the terminal 110 is moved from an area where the first base station is located to an area where the second base station is located, the terminal may perform a handover from a cell corresponding to the first base station to a cell corresponding to the second base station.

Figures 2, 3:
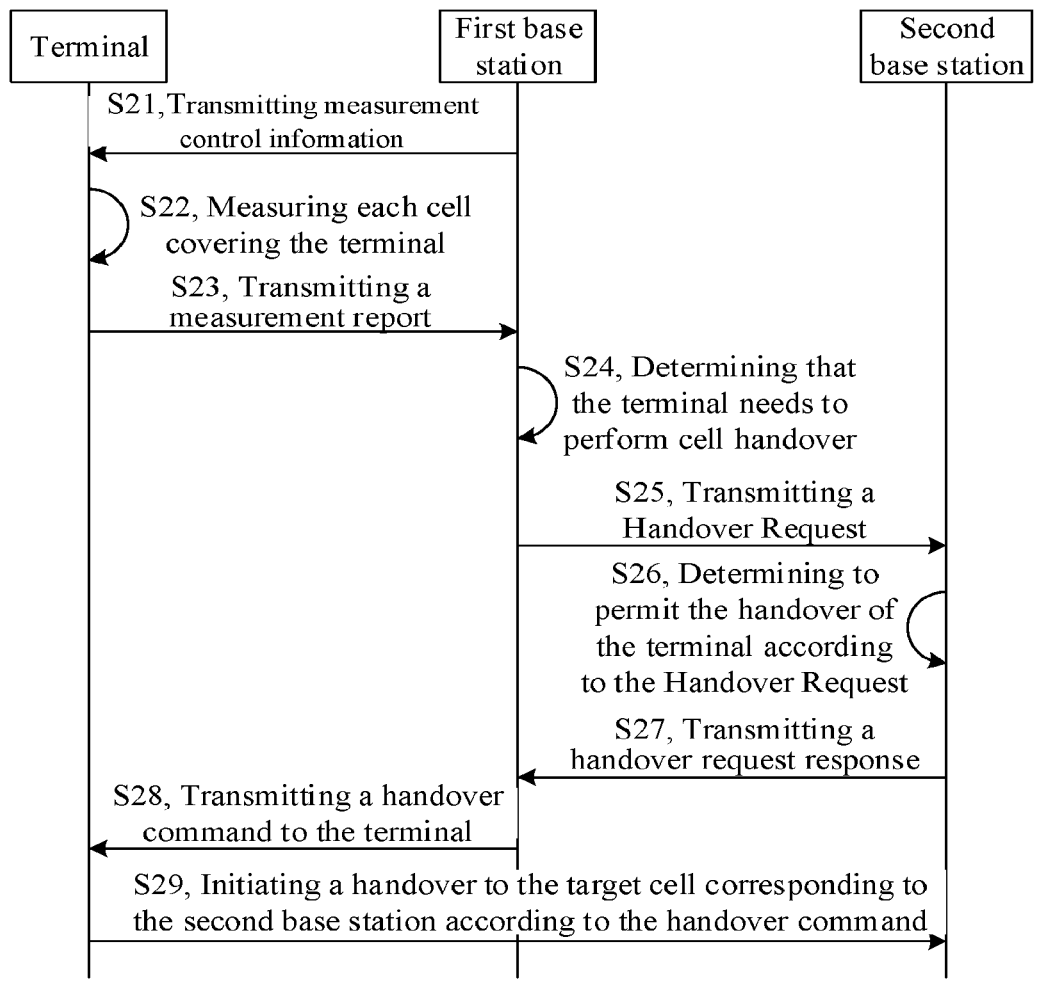
FIG. 2 illustrates a flowchart of a cell handover according to an exemplary embodiment.
FIG. 3 illustrates a flowchart of a method for cell handover according to an exemplary embodiment.

For instance, referring to FIG. 2, a flowchart of a cell handover according to an exemplary embodiment is illustrated. As shown in FIG. 2, the process of a handover for a terminal from one cell to another cell may be as follows.

In step 21, the first base station transmits measurement control information to an accessed terminal. After the terminal accesses the first base station, the first base station may transmit the measurement control information to the terminal. The measurement control information may include frequencies at which the measurement is performed, parameters to be measured and the time when the measurement report is reported.

Herein, the frequencies at which the measurement is performed may be configured to indicate frequencies at which the base station performs cell measurement, and the parameters to be measured may include RSRP (Reference Signal Receiving Power), Reference Signal Receiving Quality (RSRQ), and etc.

In step 22, the terminal measures each cell covering the terminal according to the measurement control information. After receiving the measurement control information transmitted by the first base station, the terminal measures relevant parameters of each of surrounding cells according to the frequencies indicated by the measurement control information, and generates a measurement report.

In step 23, the terminal transmits the measurement report to the first base station. When the reporting time for the measurement report arrives, the terminal may transmit the measurement report generated according to the measurement result to the first base station, and the measurement report may include the measured parameters corresponding to each cell.

Herein, the terminal may transmit the above measurement report on the uplink resource indicated by the first base station.

In step 24, the first base station determines that the terminal needs to perform cell handover according to the measurement report transmitted by the terminal. After receiving the measurement report transmitted by the terminal, the first base station may make a handover decision to determine whether the terminal satisfies the conditions for handover to one or more measured cells. If the terminal satisfies the conditions for handover to one or more cells (for example, if the measurements performed by the terminal indicate that the signal quality of the current cell 1 is poor, while the signal quality of another cell 2 is good, it can be considered that the terminal satisfies the conditions for handover from the cell 1 to the cell 2), the first base station may determine that the terminal needs to perform the cell handover.

In step 25, the first base station transmits a Handover Request to the second base station corresponding to the cell satisfying the conditions for handover. Herein, the aforementioned Handover Request may include information related to the terminal, such as service information and other access stratum information related to the terminal.

In step 26, the second base station determines to permit the terminal to perform the handover according to the Handover Request. After receiving the Handover Request, the second base station may permit the terminal to access according to the service information carried in the Handover Request, and then perform radio resource configuration.

In step 27, the second base station transmits a handover request response to the first base station. After permitting the terminal to perform a handover to the cell corresponding to the second base station, the second base station may generate the handover request response, which includes an access admission result and radio resource configuration information of the target cell, and transmits the handover request response to the first base station.

In step 28, the first station transmits a handover command to the terminal. After receiving the handover request response, the first base station transmits a handover response to the terminal, and the handover response may include the information carried in the handover request response.

In step 29, the terminal initiates a handover to the target cell corresponding to the second base station according to the handover command. After receiving the handover command, the terminal may initiate synchronization with the target cell indicated by the handover command. And after the synchronization is completed, the terminal may initiate a random access procedure to the target cell. For example, after receiving the handover command, the terminal starts a T304 timer and starts to perform synchronization with the target cell to initiate the random access procedure. If the random access procedure is successful before the T304 timer expires, the terminal may perform a handover from an original cell to the target cell. If the random access procedure is not successful when the T304 timer expires, the terminal may determine the handover fails, and initiate a reestablishment process to the target cell.

Since a reestablishment process initiated after one handover failure also has a relatively high probability of failure, the embodiments of the present disclosure provide an enhanced solution based on the handover process shown in FIG. 2 above, in order to improve the success probability of the cell handover. That is, in the above step 206, the first base station may initiate a handover request to base stations corresponding to a plurality of cells, and prepare a plurality of target cells for the terminal to perform the handover. And in the above step 29, the handover command transmitted to the terminal may carry a plurality of candidate handover target cells, and the terminal may select one cell from the plurality of target cells for handover according to a predetermined selection rule. If the handover fails, the terminal may select another cell from the plurality of target cells to initiate the reestablishment process.

In initiating a reestablishment to another target cell, the terminal needs to perform resynchronization with the reestablished target cell. Herein, in performing synchronization with the target cell, the terminal needs to read the synchronization signal carried in the radio signal transmitted by the target cell. Herein, in the LTE system, the synchronization signal may include a Primary Synchronization Signal (PSS) and a Secondary Synchronization Signal (SSS); in the 5G NR system, the synchronization signal may include a Synchronization Signal Block (SSB). Since the synchronization signals are periodically transmitted by the base station in time-domain, and the distribution of the synchronization signals in the time-domain is relatively sparse. That is, after the base station completes a transmission of the synchronization signal, it may take several milliseconds before transmitting the next transmission of the synchronization signal. Therefore, in the process of cell handover, the terminal may take long time to complete the synchronization with the target cell during the handover or reestablishment process between the terminal and the target cell, causing a long time delay and service interruption, and affecting the performance of the cell handover.

In order to further improve the efficiency of the cell handover, in the embodiments of the present disclosure, the handover command transmitted to the terminal by the base station not only indicates the plurality of target cells, but also includes information indicating whether a plurality of target cells are in slot synchronization with one another (that is, time-domain resources for the synchronization signals are the same). Correspondingly, after receiving the handover command, for two or more cells in slot synchronization, the terminal can use a same synchronization result for performing handover or reestablishment, during the subsequent handover process or the reestablishment process after the failure of the handover. And there is no need to perform the synchronization step during each handover or reestablishment process. Therefore, the time delay and service interruption caused by synchronization during cell handover or reestablishment can be reduced, thereby improving the efficiency of cell handover and system communication performances.

FIG. 3 illustrates a flowchart of a method for cell handover according to an exemplary embodiment. As shown in FIG. 3, the method for cell handover is applied in the wireless communication system in FIG. 1, and is executed by the terminal 110 in FIG. 1. The method may include the following steps.

In step 301, a handover command and a timing sequence relationship is received from a base station. Herein, the handover command is configured to instruct the terminal to perform a handover to one of at least two target cells, and the timing sequence relationship is configured to indicate whether any two cells of the at least two target cells are in slot synchronization with each other, and the time slot synchronization indicates that time-domain resources for synchronization signals for the two cells are the same.

In step 302, synchronization with a first cell of the at least two target cells is performed.

In step 303, in response to initiation of a handover to the first cell according to a result of the synchronization with the first cell and failure of the handover, a second cell is determined from the at least two target cells. Herein, the second cell is in slot synchronization with the first cell. Herein, the aforementioned result of the synchronization may be a resource location of a synchronization signal of a corresponding target cell and a resource location of other information associated with the synchronization signal, such as, a resource location of a broadcast channel and a resource location of a System Information Block (SIB) message.

In step 304, a connection reestablishment to the second cell is initiated according to the result of the synchronization with the first cell. Alternatively, the timing sequence relationship may be further configured to indicate whether any two cells of the at least two target cells have a same hyper frame number (HFN). And the step of initiating the connection reestablishment to the second cell according to the result of the synchronization with the first cell, may include acquiring an HFN of the first cell, in response to that the timing sequence relationship indicates that the HFN of the first cell and an HFN of the second cell are the same, where the HFN of the first cell is acquired during a process of performing synchronization with the first cell, and performing encryption and integrity protection for a reconfiguration complete message through the HFN of the first cell, when transmitting the reconfiguration complete message to the second cell.

Alternatively, the step of determining the second cell from the at least two target cells, may include acquiring a set of candidate cells according to the timing sequence relationship, wherein the set of candidate cells comprise one or more cells in the at least two target cells, which are in slot synchronization with the first cell, and to which the terminal has not initiated a connection reestablishment yet, and determining the second cell from the set of candidate cells according to a predetermined selection rule, in response to that the set of candidate cells comprise at least two cells.

Alternatively, the step of determining the second cell from the set of candidate cells according to the predetermined selection rule, may include determining a cell from the set of candidate cells as the second cell randomly, or determining a cell with a strongest signal strength among the set of candidate cells as the second cell, or determining a cell supporting a service type as the same as that corresponding to the terminal among the set of candidate cells as the second cell.

Alternatively, the step of initiating the connection reestablishment to the second cell according to the result of the synchronization with the first cell, may include performing signal measurement on the second cell to acquire a signal measurement result, where the signal measurement result comprises at least one of a reference signal receiving power (RSRP) or a reference signal receiving quality (RSRQ), and initiating the connection reestablishment to the second cell according to the result of the synchronization with the first cell, in response to that the signal measurement result is no lower than a predetermined measurement result threshold.

In summary, in the scheme illustrated in the embodiments of the present disclosure, when a terminal receives a handover command indicating at least two target cells from a base station, the terminal also receives a timing sequence relationship indicating whether the at least two target cells are in slot synchronization. During the subsequent process of cell handover, in response to initiation of a handover to the first cell and failure of the handover, the terminal may preferentially select a second cell which is in slot synchronization with the first cell, for initiating connection reestablishment. Since the second cell is in slot synchronization with the first cell (i.e., time-domain resources for synchronization signals for the first cell and the second cell are the same), and the relationship between the resource location of the synchronization signal and the resource location of the subsequent broadcast channel and the SIB message for accessing is fixed, the terminal may directly take the result of the synchronization with the first cell as a result of the synchronization with the second cell, and the terminal may directly acquire a message carried in the broadcast channel and the SIB message for accessing the second cell from the signals transmitted by the second cell. Thus, the terminal may omit the synchronization step in the reestablishment process to shorten the time required for the reestablishment process, so as to reduce time delay and service interruption caused by the synchronization in the cell handover or the reestablishment process, thereby improving efficiency of the cell handover and system communication performance.

Figure 4:
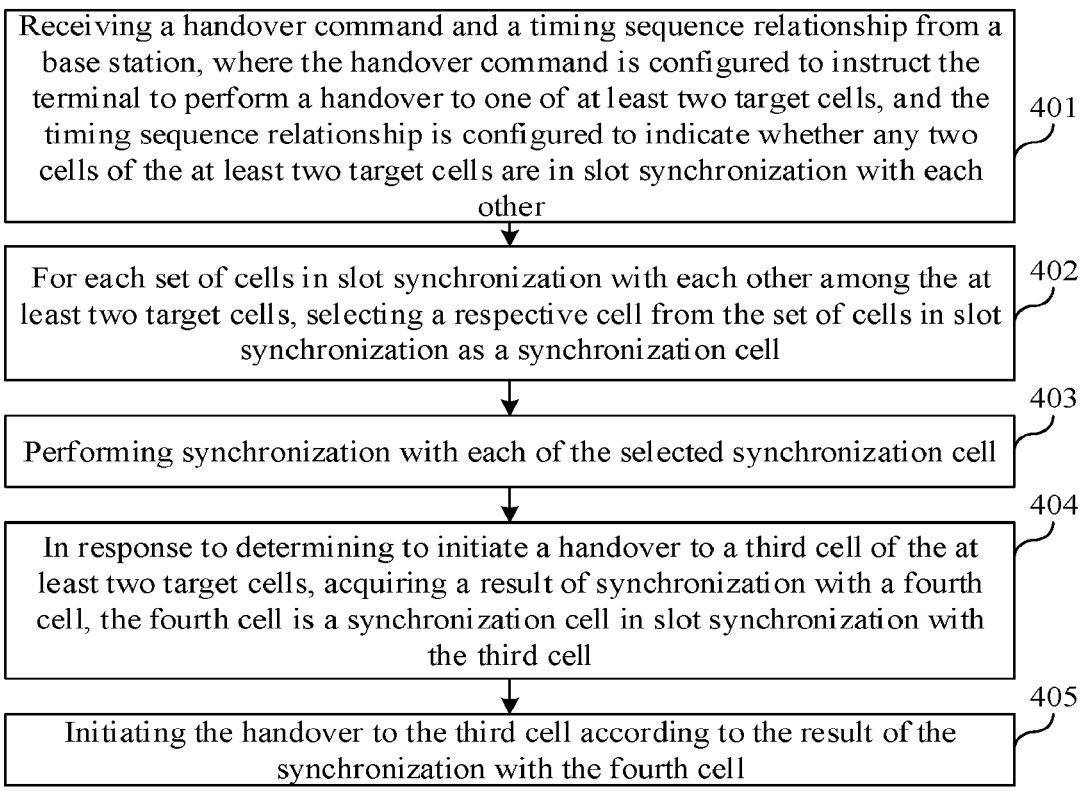
FIG. 4 illustrates a flowchart of a method for cell handover according to an exemplary embodiment.

FIG. 4 illustrates a flowchart of a method for cell handover according to an exemplary embodiment. As shown in FIG. 4, the method for cell handover is applied in the wireless communication system in FIG. 1, and is executed by the terminal 110 in FIG. 1. The method may include the following steps.

In step 401, a handover command and a timing sequence relationship are received from a base station. Herein, the handover command is configured to instruct the terminal to perform a handover to one of at least two target cells, and the timing sequence relationship is configured to indicate whether any two cells of the at least two target cells are in slot synchronization with each other, and the time slot synchronization indicates that time-domain resources for synchronization signals for the two cells are the same.

In step 402, for each set of cells in slot synchronization with each other among the at least two target cells, a respective cell is selected from the set of cells in slot synchronization as a synchronization cell.

In step 403, synchronization with each of the selected synchronization cell is performed.

In step 404, when initiating a handover to a third cell of the at least two target cells, a result of the synchronization with a fourth cell is acquired, where the fourth cell is a synchronization cell in slot synchronization with the third cell.

In step 405, the handover to the third cell is initiated according to the result of the synchronization with the fourth cell.

Alternatively, the timing sequence relationship may be further configured to indicate whether any two cells of the at least two target cells have a same hyper frame number (HFN). And the step of initiating the handover to the third cell according to the result of the synchronization with the fourth cell, may include acquiring an HFN of the fourth cell, in response to that the timing sequence relationship indicates that an HFN of the third cell and the HFN of the fourth cell are the same, where the HFN of the fourth cell is acquired during a process of performing synchronization with the fourth cell, and performing encryption and integrity protection for a reconfiguration complete message through the HFN of the fourth cell, when transmitting the reconfiguration complete message to the third cell.

Alternatively, the method may further include determining a fifth cell from the at least two target cells, after initiating the handover to the third cell and failure of the handover, wherein the fifth cell is in slot synchronization with the fourth cell, and initiating a connection reestablishment to the fifth cell according to the result of the synchronization with the fourth cell.

In summary, in the scheme illustrated in the embodiments of the present disclosure, when a terminal receives a handover command indicating at least two target cells from a base station, the terminal also receives a timing sequence relationship indicating whether the at least two target cells are in slot synchronization. During the subsequent process of cell handover, before the cell handover, for cells in slot synchronization with each other among the least two target cells, the terminal may perform synchronization with one of the cells; when performing the cell handover, if the terminal selects a third cell for handover, the terminal may directly use a result of the synchronization for a cell in slot synchronization with the third cell, to initiate a handover procedure to the third cell. Thus, the terminal may omit the synchronization step in the handover process to shorten the time required for the reestablishment process, so as to reduce time delay and service interruption caused by the synchronization in the cell handover or the reestablishment process, thereby improving efficiency of the cell handover and system communication performance.

Figure 5:
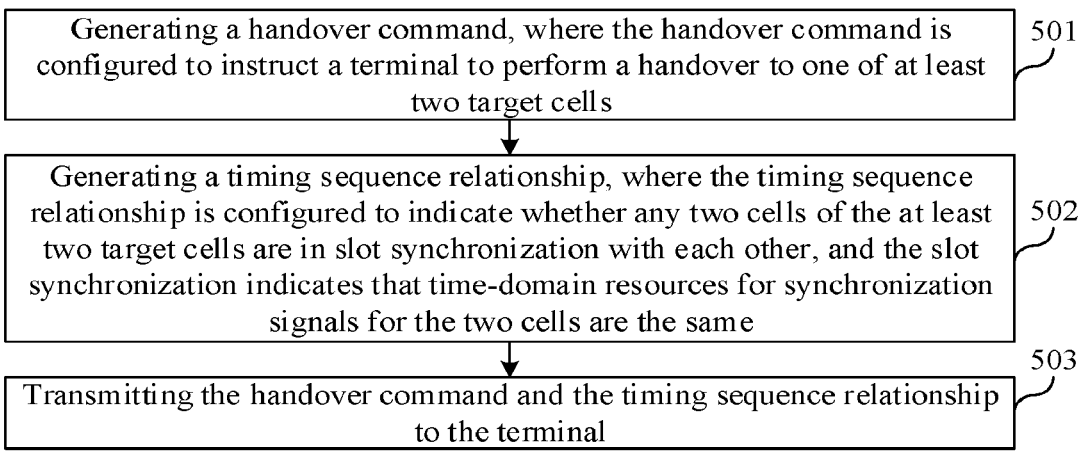
FIG. 5 illustrates a flowchart of a method for cell handover according to an exemplary embodiment.

FIG. 5 illustrates a flowchart of a method for cell handover according to an exemplary embodiment. As shown in FIG. 5, the method for cell handover is applied in the wireless communication system in FIG. 1, and is executed by the base station 120 in FIG. 1. The method may include the following steps.

In step 501, a handover command is generated, where the handover command is configured to instruct a terminal to perform a handover to one of at least two target cells.

In step 502, a timing sequence relationship is generated, where the timing sequence relationship is configured to indicate whether any two cells of the at least two target cells are in slot synchronization with each other, and the slot synchronization indicates that time-domain resources for synchronization signals for the two cells are the same.

In step 503, the handover command and the timing sequence relationship are transmitted to the terminal.

Alternatively, the step of generating the timing sequence relationship may include acquiring time-domain resource offset information of each of the at least two target cells, where for each of the at least two target cells, the time-domain resource offset information is configured to indicate a time-domain offset value between time-domain resource for the target cell and time-domain resource for the cell accessed by the terminal currently, and generating the timing sequence relationship according to the time-domain resource offset information of the each of the at least two target cells.

Alternatively, the timing sequence relationship may be further configured to indicate whether any two cells of the at least two target cells have a same hyper frame number (HFN).

In summary, in the scheme illustrated in the embodiments of the present disclosure, the handover command transmitted to the terminal by the base station not only indicates the plurality of target cells, but also includes the timing sequence relationship indicating whether the plurality of target cells are in slot synchronization. As such, during the subsequent process of cell handover or the process of reestablishment after the failure of the handover, for two or more cells in slot synchronization, the terminal may use a same synchronization result for the handover or the reestablishment. Thus, delay and service interruption caused by the synchronization in the cell handover or the reestablishment process can be reduced, thereby improving efficiency of the cell handover and system communication performance.

The present disclosure introduces the schemes shown in FIGS. 3 and 5 above, by taking the terminal omitting the synchronization step in the reestablishment process after the failure of the handover according to the timing sequence relationship of a plurality of target cells as an example.

Figure 6:
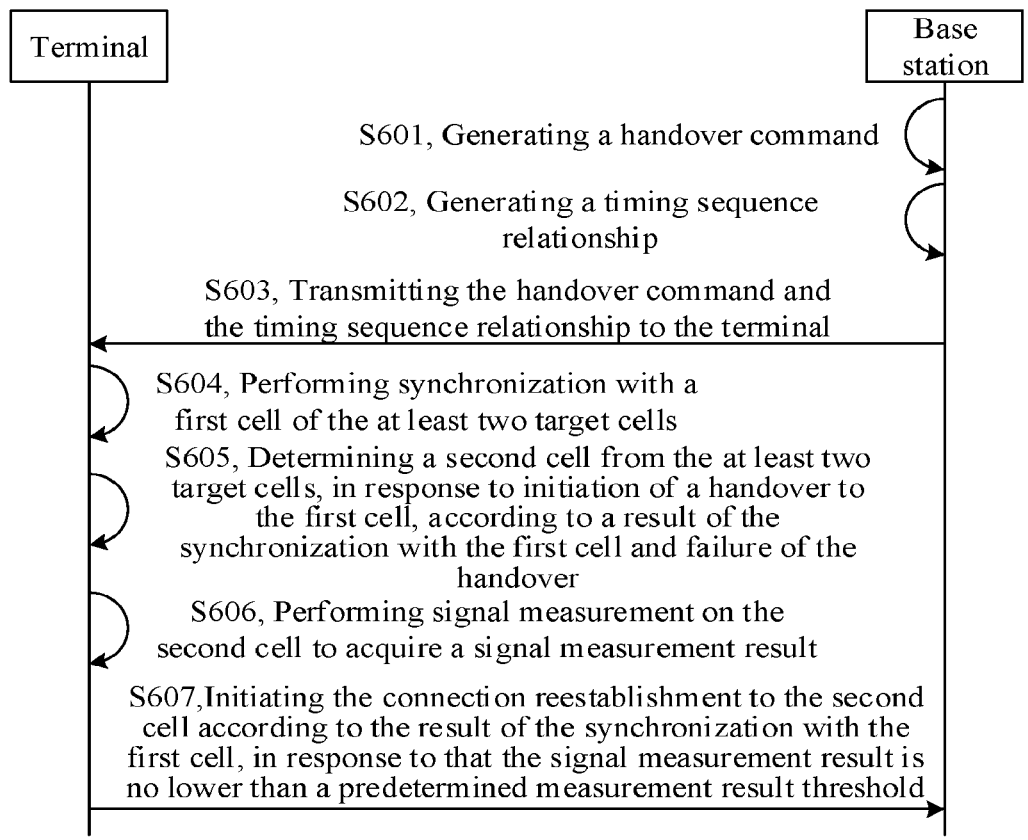
FIG. 6 illustrates a flowchart of a method for cell handover according to an exemplary embodiment.

FIG. 6 illustrates a flowchart of a method for cell handover according to an exemplary embodiment. As shown in FIG. 6, the method for cell handover is applied in the wireless communication system in FIG. 6. The method may include the following steps.

In step 601, a base station generates a handover command, where the handover command is configured to instruct a terminal to perform a handover to one of at least two target cells.

In the embodiments of the present disclosure, after receiving measurement results for a plurality of cells transmitted by the terminal, the base station may determine several cells satisfying handover conditions according to the measurement results, and transmit a handover request to several base stations, each corresponding to a respective one of the determined several cells respectively. After receiving a handover request response returned by each of the several base stations, the base station may determine the at least two cells that the terminal is permitted to access, indicated by the handover request responses returned by the several base stations, as the at least two target cells. And the base station may generate a handover command that includes radio resource configuration information of the at least two target cells.

In step 602, the base station generates a timing sequence relationship, where the timing sequence relationship is configured to indicate whether any two cells of the at least two target cells are in slot synchronization with each other, and the slot synchronization indicates that time-domain resources for synchronization signals for the two cells are the same.

In the embodiments of the present disclosure, in addition to performing the aforementioned step 602, the base station may further generate a timing sequence relationship configured to indicate whether any two cells of the at least two target cells arein slot synchronization with each other. Herein, the above slot synchronization may indicate that time-domain resources for synchronization signals in radio signals transmitted by the two cells are the same.

Figure 7:
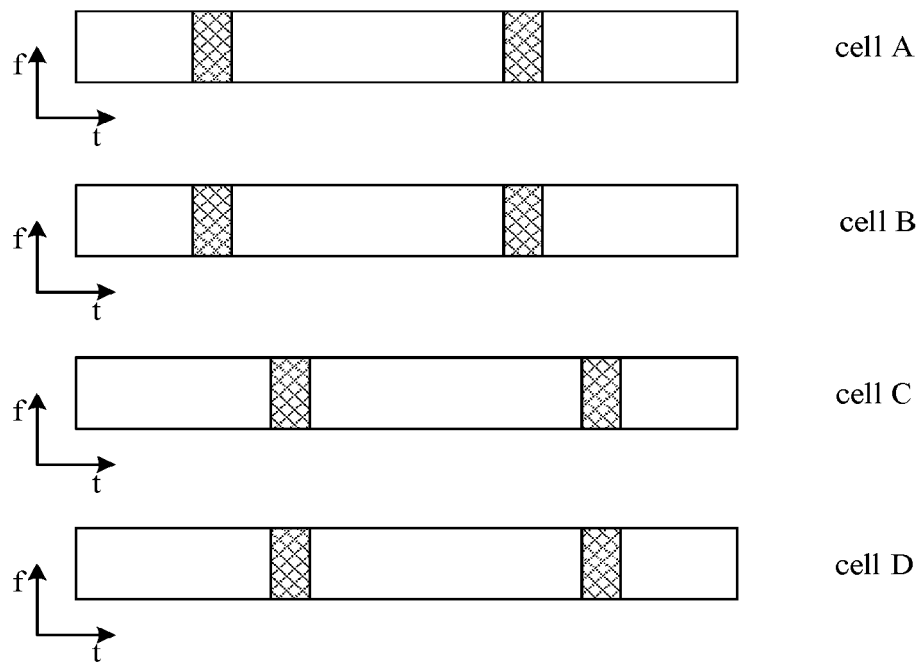
FIG. 7 illustrates a schematic diagram of inter-cell slot synchronization involved in the embodiment shown in FIG. 6.

For instance, referring to FIG. 7, a schematic diagram of inter-cell slot synchronization involved in the embodiment of the present disclosure is illustrated. As shown in FIG. 7, among time-frequency resources occupied by radio signals respectively transmitted by cell 1, cell 2, cell 3, and cell 4, the time-frequency resources in diagonal grid regions are configured to carry synchronization signals. Herein, the diagonal grid regions for cell 1 and cell 2, i.e., the time-frequency resources occupied by the radio signals transmitted by cell 1 and cell 2 are same in time-domain, and the diagonal grid regions for cell 3 and cell 4, i.e., the time-frequency resources occupied by the radio signals transmitted by cell 3 and cell 4 are same in the time-domain. However, the diagonal grid regions for cell 1 and cell 3, i.e., the time-frequency resources occupied by the radio signals transmitted by cell 1 and cell 3 are different in the time-domain. Then, it can be considered that cell 1 and cell 2 are in slot synchronization with each other, cell 3 and cell 4 are in slot synchronization with each other, and cell 1 and cell 3 are not in slot synchronization with each other.

Alternatively, in generating the timing sequence relationship, the base station may acquire time-domain resource offset information of each of the at least two target cells. Herein, the time-domain resource offset information may be configured to indicate a time-domain offset value between time-domain resources for the each of the at least two target cells and time-domain resources for the cell accessed by the terminal currently. And the base station may generate the timing sequence relationship according to the time-domain resource offset information of the each of the at least two target cells.

In the embodiments of the present disclosure, the base station may directly or indirectly exchange information with other nearby base stations, to obtain, for each of the other nearby base stations, the time-domain offset value between the time-domain resources for a cell controlled by a respective one of the nearby base stations and the time-domain resource for the cell currently accessed by the terminal. And after receiving the handover request responses, the base station may generate the aforementioned timing sequence relationship, according to the target cells indicated by the handover request responses and the time-domain offset values between the time-domain resources for the target cells and the time-domain resource for the cell accessed by the terminal currently. Or, when a base station corresponding to a target cell returns a handover request response to the base station corresponding to the cell currently accessed by the terminal, the handover request response may carry time-domain indication information of the target cell. Here, the time-domain indication information may be configured to indicate time-domain positions of the time-frequency resources for the target cell. After the base station corresponding to the cell currently accessed by the terminal receives the handover request response, the base station may obtain the time-domain resource offset information for the target cell according to the time-domain indication information carried in the handover request response and the time-domain indication information for the cell currently accessed by the terminal, and thereby generate the aforementioned timing sequence relationship.

Herein, a time-domain offset value between time-domain resources for two cells may refer to a time-domain offset value between start time points of subframes for the two cells. Further, the time-domain offset value between the time-domain resources for the two cells may be represented by an offset between the time-domain resources occupied by the synchronization signals in the radio signals respectively transmitted by the two cells.

For instance, referring to FIG. 7, assuming that cell 1 is the cell currently accessed by the terminal, cell 2, cell 3, and cell 4 are the target cells that three terminals can perform a handover to access. As shown in FIG. 7, if the time-domain offset value between the synchronization signals of cell 1 and cell 2 is 0, while the time-domain offset value between the synchronization signal of cell 3 and the synchronization signal of cell 1 and the time-domain offset value between the synchronization signal of cell 4 and the synchronization signal of cell 1 are the same and is not equal to zero, then the aforementioned timing sequence relationship generated by the base station may indicate that cell 3 is in slot synchronization with cell 4, and cell 2 is not in slot synchronization with cell 3 or cell 4.

Herein, the aforementioned timing sequence relationship may be represented in the form of an array. For example, the aforementioned timing sequence relationship may include at least one array, and each of the at least one array may be composed of identifications of the cells that are in slot synchronization, and two cells from two different arrays are not in slot synchronization.

For example, if the target cells are cell 2, cell 3 and cell 4 as described above shown in FIG. 7, cell 3 and cell 4 are in slot synchronization, and cell 2 is not in slot synchronization with cell 3 or cell 4, then the timing sequence relationship generated by the base station may include two arrays: {identification of cell 2}, {identification of cell 3; identification of cell 4}.

Alternatively, the timing sequence relationship may be further configured to indicate whether any two cells of the at least two target cells have the same hyper frame number (HFN).

Herein, the above base station may directly or indirectly exchange information with other nearby base stations, to obtain the HFNs of cells controlled by the other nearby base stations. And after receiving the handover request response, the base station may generate the above timing sequence relationship according to the target cells indicated by the handover request responses and the pre-acquired HFNs of the target cells, and the HFN of the cell currently accessed by the terminal. Or, when a base station corresponding to a target cell returns the handover request response to the base station corresponding to the cell currently accessed by the terminal, the HFN of the target cell may be carried in the handover request response. After receiving the handover request response, the base station corresponding to the cell currently accessed by the terminal may generate the above timing sequence relationship, according to the HFNs of the target cells carried in the handover request responses and the HFN of the cell currently accessed by the terminal.

Herein, the above step 601 and step 602 may be performed at the same time, or the above step 602 may also be performed after the step 601. The embodiments of the present disclosure do not limit the execution order of steps 601 and 602.

In step 603, the base station transmits the handover command and the timing sequence relationship to the terminal, and the terminal receives the handover command and the timing sequence relationship. Herein, the base station may include the timing sequence relationship in the handover command, and transmit the handover command to the terminal. Or, the base station may transmit the timing sequence relationship through other signaling independent of the handover command. The embodiments of the present disclosure do not limit the mode for transmitting the timing sequence relationship and the handover command.

In step 604, the terminal performs synchronization with a first cell of the at least two target cells. Herein, after receiving the above handover command, the terminal may select, according to a predetermined cell selection rule, a cell from at least two target cells as the first cell to be switched preferentially. For instance, the terminal may select the first cell randomly.

Alternatively, the terminal may take the cell with the highest signal strength among the at least two target cells as the first cell, according to the pre-measured signal strengths of the cells (corresponding to the signal strengths measured in step 23 in the embodiment shown in FIG. 2 above).

Alternatively, the terminal may obtain a current service type of the terminal and service types supported by each of at least two target cells, and select one of the at least two target cells that supports the current service type of the terminal as the first cell. For example, the terminal may select the cell with the highest signal strength from the target cells that supports the current service type of the terminal as the first cell.

Alternatively, in the embodiments of the present disclosure, in terms of selecting the first cell, the terminal may select a target cell with the highest signal strength and/or a target cell supporting the current service type of the terminal from a set of target cells including the most cells in slot synchronization, as the first cell. Herein, the embodiments of the present disclosure do not limit the mode in which the terminal selects the first cell.

In step 605, in response to initiation of a handover to the first cell according to a result of the synchronization with the first cell and failure of the handover, the terminal determines a second cell in slot synchronization with the first cell from the at least two target cells.

Herein, the initiation of the handover to the first cell and the failure of the handover may indicate that during a time period of a T304 timer, one of the steps, i.e., the step that the terminal performs synchronization with the first cell to the step that the terminal successfully performs the handover to the first cell, fails. For example, the terminal does not receive a Physical Downlink Control CHannel (PDCCH) or other random access messages (such as, msg4) transmitted by the target cells when the T304 timer reaches a predetermined time period. The embodiments of the present disclosure do not limit the situation that the terminal initiates the handover to the first cell and the handover fails.

Alternatively, in order to determine the second cell from the at least two target cells, the terminal may acquire a set of candidate cells according to the timing sequence relationship. Herein, the set of candidate cells may include one or more cells, which are in slot synchronization with the first cell and to which the terminal has not initiated a connection reestablishment yet, among the at least two target cells. And the terminal may determine the second cell from the set of candidate cells according to a predetermined selection rule, in response to that the set of candidate cells include at least two cells.

Alternatively, the step of determining the second cell from the set of candidate cells according to the predetermined selection rule, may include determining a cell from the set of candidate cells as the second cell randomly, or determining a cell with a strongest signal strength among the set of candidate cells as the second cell, or determining a cell supporting a service type as the same as that corresponding to the terminal among the set of candidate cells as the second cell.

In step 606, the terminal performs signal measurement on the second cell to acquire a signal measurement result, wherein the signal measurement result comprises at least one of a reference signal receiving power (RSRP) or a reference signal receiving quality (RSRQ).

Since the terminal performs cell measurement and reports the cell, there may be a time period between receiving the handover command and the connection reestablishment after the failure of the handover. During the time period, due to the rapid movement of the terminal and other reasons, the signal quality of the target cells may change, resulting in the deterioration of the signal quality of one or some target cells (for example, the terminal moves out of the coverage of the target cells, or the terminal moves into an underground garage, an elevator, or other locations where the signal is severely blocked). Therefore, before the terminal initiates the connection reestablishment, the terminal may measure the signal of the determined second cell again to obtain the parameters such as RSRP and/or RSRQ of the second cell.

In step 607, the terminal initiates the connection reestablishment to the second cell according to the result of the synchronization with the first cell, in response to that the signal measurement result is no lower than a predetermined measurement result threshold. Herein, the above connection reestablishment may refer to a connection reestablishment of Radio Resource Control (RRC).

Herein, when the RSRP and/or RSRQ obtained through signal measurement are no lower than the predetermined measurement result threshold, it may indicate that the signal quality of the second cell is relatively good. At this time, the terminal may initiate a connection reestablishment to the second cell according to the result of the synchronization with the first cell. Since the second cell is in slot synchronization with the first cell (i.e. time-domain resources for synchronization signals for the first cell and time-domain resources for synchronization signals for the second cell are the same), and the relationship between the resource location of the synchronization signal and the resource locations of the subsequent broadcast channel and the SIB message for accessing is fixed, the terminal may directly take the result of the synchronization with the first cell as a result of the synchronization with the second cell, and then directly acquire a message carried in the broadcast channel and the SIB message for accessing the second cell from the signals transmitted by the second cell. Thus, the terminal can successfully complete the subsequent steps for the connection reestablishment without the synchronization step.

Alternatively, the timing sequence relationship may further be configured to indicate whether any two cells of the at least two target cells have a same hyper frame numbers (HFN). When the terminal initiates the connection reestablishment to the second cell according to the result of the synchronization with the first cell, and the timing sequence relationship indicates that the HFN of the first cell and an HFN of the second cell are the same, the terminal may acquire the HFN of the first cell, where the HFN of the first cell is acquired during a process of performing synchronization with the first cell. And the terminal may perform encryption and integrity protection for a reconfiguration complete message through the HFN of the first cell, when transmitting the reconfiguration complete message to the second cell.

After receiving the handover command, the terminal may update an algorithm and key for encryption and integrity protection for a Packet Data Convergence Protocol (PDCP) layer according to the configuration carried in the handover command, and after receiving the reconfiguration complete message generated by a RRC layer at the PDCP layer, the terminal may process the reconfiguration complete message according to the new algorithm for encryption and integrity protection. The input parameters for encryption and integrity protection may include DIRECTION, BEARER and COUNT, where DIRECTION represents a direction of data transmission, BEARER represents a radio bearer identifier, and COUNT represents a counter. Herein, COUNT may be composed of an HFN and a transmission sequence number for the PDCP layer. Each time the PDCP layer transmits a PDCP PDU (Protocol Data Unit), the transmission sequence number will be increased by one. Herein, the HFN may be configured by system broadcast, and the HFN may be carried in a SIB1 message in both LTE system and NR system.

In the embodiments of the present disclosure, in addition to supporting whether the target cells are in slot synchronization with each other according to the timing sequence relationship, the base station may also indicate whether two target cells have a same HFN according to the timing sequence relationship. During the subsequent process for the connection reestablishment, if the first cell is in slot synchronization with the second cell, and the first cell and the second cell has a same HFN, in response to the failure of the handover to the first cell and the initiation of the connection reestablishment to the second cell, the terminal may not only omit the step of synchronization with the second cell, but also may perform the encryption and integrity protection for a reconfiguration complete message directly based on the HFN of the first cell obtained during the synchronization with the first cell. Thus, there is no need to extract the HFN from the SIB1 message transmitted by the second cell, thereby further reducing the time required for the connection reestablishment.

In summary, in the scheme illustrated in the embodiments of the present disclosure, when the terminal receives the handover command indicating at least two target cells from the base station, the terminal may also receive the timing sequence relationship indicating whether the at least two target cells are in slot synchronization with each other. During the subsequent process of cell handover, in response to initiation of a handover to the first cell and failure of the handover, the terminal may preferentially initiate a reestablishment to a second cell that is in slot synchronization with the first cell. Thus, the time required for the reestablishment process may be shortened, thereby reducing time delay and service interruption caused by the synchronization in the cell handover or the reestablishment process, thereby improving efficiency of the cell handover and system communication performance.

In addition, according to the scheme illustrated in the embodiments of the disclosure, when the first cell is in slot synchronization with the second cell, and the first cell and the second cell have a same HFN, the terminal may perform the encryption and integrity protection for a reconfiguration complete message directly based on the HFN of the first cell, to further shorten the time required for the connection reestablishment, thereby improving efficiency of the cell handover and system communication performance.

The present disclosure introduces the schemes shown in FIG. 4 and FIG. 5 above by taking that an example that the terminal performs the synchronization before the cell handover according to the timing sequence relationship of one or more target cells, and skips the synchronization step during the handover process and the reestablishment process after the failure of the handover.

Figure 8:
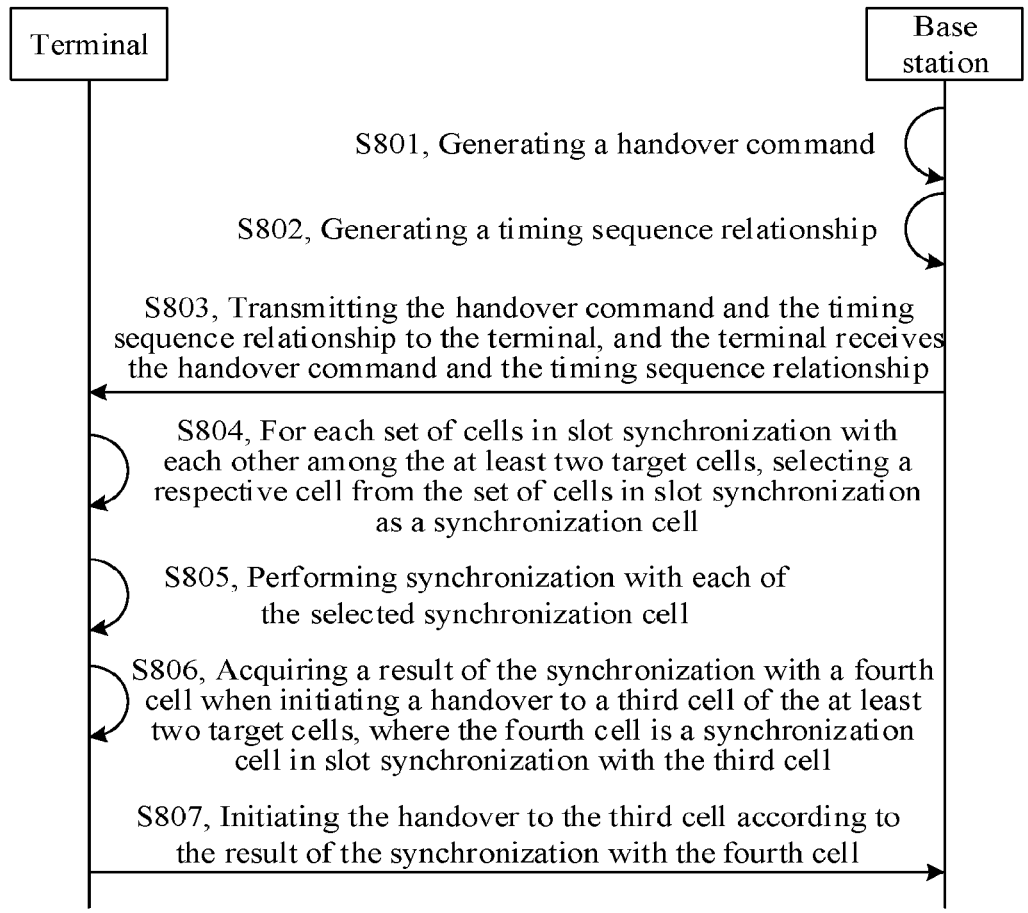
FIG. 8 illustrates a flowchart of a method for cell handover according to an exemplary embodiment.

FIG. 8 illustrates a flowchart of a cell handover according to an exemplary embodiment. As shown in FIG. 8, the method for cell handover is applied in the wireless communication system in FIG. 1, and is executed by the terminal 110 in FIG. 1. The method may include the following steps.

In step 801, a base station generates a handover command, where the handover command is configured to instruct a terminal to perform a handover to one of at least two target cells.

In step 802, the base station generates a timing sequence relationship, where the timing sequence relationship is configured to indicate whether any two cells of the at least two target cells are in slot synchronization with each other, and the slot synchronization indicates that time-domain resources for synchronization signals for the two cells are the same.

Alternatively, in order to generate the timing sequence relationship, the base station may acquire time-domain resource offset information of each of the at least two target cells. Herein, the time-domain resource offset information may be configured to indicate a time-domain offset value between time-domain resource for the each of the at least two target cells and time-domain resource for the cell accessed by the terminal currently. And the base station may generate the timing sequence relationship according to the time-domain resource offset information of the each of the at least two target cells.

Alternatively, the timing sequence relationship may be further configured to indicate whether any two cells of the at least two target cells have a same hyper frame number (HFN).

In step 803, the base station transmits the handover command and the timing sequence relationship to the terminal, and the terminal receives the handover command and the timing sequence relationship.

Herein, for the execution process of the above step 801 to step 803, reference may be made to the description of step 601 to step 603 in the embodiment shown in FIG. 6, which will not be repeated here.

In step 804, for each set of cells in slot synchronization with each other among the at least two target cells, the terminal selects a cell from the set of cells in slot synchronization with each other as a synchronization cell.

In the embodiments of the present disclosure, for at least one target cell that is in slot synchronization with each other from at least two target cells, the terminal may select one cell from the at least one target cell as a synchronization cell. For example, assuming that the at least two target cells include cell A, cell B and cell C, where cell A is in slot synchronization with cell B, and cell A is not in slot synchronization with cell C, the terminal may select one of cell A and cell B as a synchronization cell (e.g. Cell A), may further select Cell C to obtain a synchronization cell.

Herein, when a set of cells in slot synchronization include two or more cells, the terminal may select one of the two or more cells as the synchronization cell randomly, or, the terminal may select a cell with the best signal quality, among the two or more cells, as a synchronization cell.

In step 805, the terminal performs synchronization with each of the selected synchronization cells respectively.

In the embodiments of the present disclosure, before initiating the handover, the terminal may keep synchronization with all the selected synchronization cells at the same time, where the selected cells in synchronization with the terminal are not in slot synchronization with each other.

In step 806, when the terminal determines to initiate a handover to a third cell of the at least two target cells, the terminal acquires a result of the synchronization with a fourth cell, where the fourth cell is a synchronization cell in slot synchronization with the third cell. When determining to initiate the handover, the terminal firstly determines the target cell to be switched (i.e., the third cell), and determines a cell (i.e., the fourth cell) in slot synchronization the third cell and in synchronization with the terminal; and the terminal acquires a result of the synchronization with the fourth cell and takes the acquired result of the synchronization as a result of the synchronization with the third cell. In the process, there is no need for the terminal to perform synchronization with the third cell, thereby saving the time for performing synchronization. Herein, the third cell and the fourth cell may be two different cells; or, the third cell and the fourth cell may be a same cell.

For instance, assuming the at least two target cells include cell A, cell B, cell C and cell D, where cell A, cell B and cell C are in slot synchronization with one another, and cell A is not in slot synchronization with cell D; and the terminal keeps the synchronization with both cell A and cell D before the initiation of the handover; if the terminal selects to cell B for initiating the handover, the terminal may directly acquire a result of the synchronization with cell A, and take the acquired result of the synchronization as the result of the synchronization with cell B.

In step 807, the terminal initiates the handover to the third cell according to the result of the synchronization with the fourth cell. For instance, assuming the terminal selects to perform a handover to cell B, and the terminal has performed synchronization with cell A in advance, where cell A is in slot synchronization with cell B, the terminal may initiate the handover to cell B directly according to the result of the synchronization with cell A, without performing synchronization with cell B.

Alternatively, the timing sequence relationship may be further configured to indicate whether any two cells of the at least two target cells have a same hyper frame numbers (HFN). When initiating the handover to the third cell according to the result of the synchronization with the fourth cell, and the timing sequence relationship indicates an HFN of the third cell and an HFN of the fourth cell are the same, the terminal may acquire the HFN of the fourth cell, where the HFN of the fourth cell is acquired during a process of performing synchronization with the fourth cell. The terminal may perform encryption and integrity protection for a reconfiguration complete message through the HFN of the fourth cell, when transmitting the reconfiguration complete message to the third cell.

Alternatively, after initiation of a handover to the third cell and failure of the handover, the terminal may determine a fifth cell from the at least two target cells, where the fifth cell is in slot synchronization with the fourth cell. The terminal may initiate a connection reestablishment to the fifth cell according to the result of the synchronization with the fourth cell.

In the embodiments of the present disclosure, after the failure of the handover to the third cell, the terminal may preferentially select another cell, which is in slot synchronization with the fourth cell, for the connection reestablishment.

For example, assuming that the at least two target cells include cell A, cell B, cell C and cell D, where cell A, cell B and cell C are in slot synchronization with one another; the terminal keeps the synchronization with cell A in advance; and after initiation of a handover to cell B and failure of the handover, the terminal may preferentially select cell D for the connection reestablishment. Or, after the initiation of the handover to the third cell and the failure of the handover, the terminal may select a cell from the remaining target cells for connection reestablishment according to a predetermined selection manner, for example, signal strength and/or service type.

For example, after the initiation of the handover to the third cell and the failure of the handover, the terminal may determine a sixth cell from the at least two target cells, where the sixth cell is any cell among the at least two target cells other than the third cell. The terminal may acquire a result of the synchronization with a seventh cell, which is a synchronization cell in slot synchronization with the sixth cell. The terminal may initiate a connection reestablishment to the sixth cell according to the result of the synchronization with the seventh cell.

In summary, in the scheme illustrated in the embodiments of the present disclosure, when a terminal receives a handover command indicating at least two target cells from a base station, the terminal also receives a timing sequence relationship indicating whether the at least two target cells are in slot synchronization. During the subsequent process of cell handover, before the cell handover, for cells in slot synchronization with each other among the least two target cells, the terminal may perform synchronization with one of the cells; when performing the cell handover, if the terminal selects a third cell for handover, the terminal may directly use a result of the synchronization for a cell in slot synchronization with the third cell, to initiate a handover procedure to the third cell. Thus, the terminal may omit the synchronization step in the handover process to shorten the time required for the handover process, so as to reduce time delay and service interruption caused by the synchronization in the cell handover or the reestablishment process, thereby improving efficiency of the cell handover and system communication performance.

In addition, in the scheme illustrated in the embodiments of the present disclosure, in response to that the third cell and the fourth cell are in slot synchronization with each other and have a same HFN, the terminal may perform encryption and integrity protection for a reconfiguration complete message to be transmitted to the third cell directly based on the HFN of the fourth cell. Thus, the time required for the connection reestablishment may further be shortened, thereby improving efficiency of the cell handover and system communication performance.

The following are apparatus embodiments of the present disclosure, which may be configured to execute the method embodiments of the present disclosure. For details that are not disclosed in the apparatus embodiments of the present disclosure, reference can be made to the method embodiment of the present disclosure.

Figure 9:
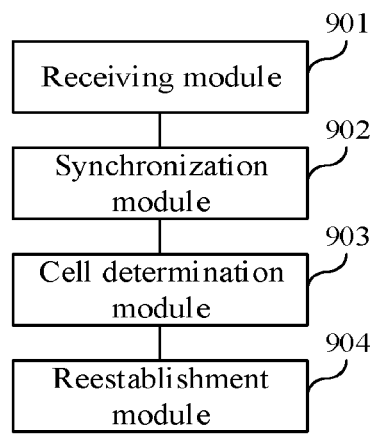
FIG. 9 illustrates a block diagram of an apparatus for cell handover according to an exemplary embodiment.

FIG. 9 illustrates a block diagram of an apparatus for cell handover according to an exemplary embodiment. As shown in FIG. 9, the apparatus for cell handover may be implemented as all or part of the terminal in the implementation environment shown in FIG. 1 through hardware or a combination of software and hardware, so as to perform the steps executed by the terminal in any of the embodiments shown in FIG. 3 or FIG. 6. Additionally, it should of course be understood that one or more of the modules described in this disclosure could be implemented by hardware, such as circuitry.

The apparatus for cell handover may include a receiving module 901 that is configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, and the time slot synchronization indicates that time-domain resources for synchronization signals for the two cells are the same. The apparatus can further include a synchronization module 902 that is configured to perform synchronization with a first cell of the at least two target cells, a cell determination module 903 that is configured to determine a second cell from the at least two target cells, in response to initiation of a handover to the first cell according to a result of the synchronization with the first cell and failure of the handover, wherein the second cell is in slot synchronization with the first cell, and a reestablishment module 904 that is configured to initiate a connection reestablishment to the second cell according to the result of the synchronization with the first cell.

Alternatively, the timing sequence relationship may be further configured to indicate whether any two cells of the at least two target cells have a same hyper frame number (HFN).

The reestablishment module 904 may be further configured to acquire an HFN of the first cell, in response to that the timing sequence relationship indicates that the HFN of the first cell and an HFN of the second cell are the same, wherein the HFN of the first cell is acquired during a process of performing synchronization with the first cell, and perform encryption and integrity protection for a reconfiguration complete message to be transmitted to the second cell through the HFN of the first cell, in response to transmitting the reconfiguration complete message to the second cell.

Alternatively, the cell determination module 903 may be further configured to acquire a set of candidate cells according to the timing sequence relationship, wherein the set of candidate cells includes one or more cells in the at least two target cells, which are in slot synchronization with the first cell, and to which the terminal has not initiated the connection reestablishment yet, and determine the second cell from the set of candidate cells according to a predetermined selection rule, in response to that the set of candidate cells comprise at least two cells.

Alternatively, in response to that the second cell is determined from the set of candidate cells according to the predetermined selection rule, the cell determination module 903 may be further configured to determine a cell from the set of candidate cells as the second cell randomly, or determine a cell with a strongest signal strength among the set of candidate cells as the second cell, or determine a cell supporting a service type as the same as that corresponding to the terminal among the set of candidate cells as the second cell.

Alternatively, the reestablishment module 904 may be further configured to perform signal measurement on the second cell to acquire a signal measurement result, wherein the signal measurement result comprises at least one of a reference signal receiving power (RSRP) or a reference signal receiving quality (RSRQ), and initiate the connection reestablishment to the second cell according to the result of the synchronization with the first cell, in response to that the signal measurement result is no lower than a predetermined measurement result threshold.

Figure 10:
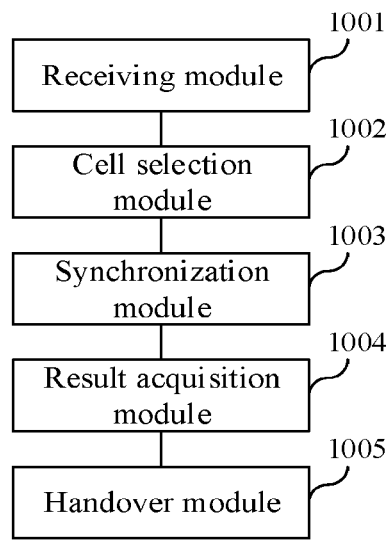
FIG. 10 illustrates a block diagram of an apparatus for cell handover according to an exemplary embodiment.

FIG. 10 illustrates a block diagram of an apparatus for cell handover according to an exemplary embodiment. As shown in FIG. 10, the apparatus for cell handover may be implemented as all or part of the terminal in the implementation environment shown in FIG. 1 through hardware or a combination of software and hardware, so as to perform the steps executed by the terminal in any of the embodiments shown in FIG. 4 or FIG. 8. The apparatus for cell handover may include a receiving module 1001, configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, wherein the time slot synchronization indicates that time-domain resources for synchronization signals for the two cells are the same. The apparatus can further include a cell selection module 1002, configured to for each set of cells in slot synchronization with each other among the at least two target cells, select a respective cell from the set of cells in slot synchronization as a synchronization cell, a synchronization module 1003, configured to perform synchronization with each of the selected synchronization cell, a result acquisition module 1004, configured to acquire a result of the synchronization with a fourth cell, when initiating a handover to a third cell of the at least two target cells, wherein the fourth cell is a synchronization cell in slot synchronization with the third cell, and a handover module 1005, configured to initiate the handover to the third cell according to the result of the synchronization with the fourth cell.

Alternatively, the timing sequence relationship may be further configured to indicate whether any two cells of the at least two target cells have a same hyper frame number (HFN).

The handover module 405 may be further configured to acquire an HFN of the fourth cell, in response to that the timing sequence relationship indicates that an HFN of the third cell and the HFN of the fourth cell are the same, wherein the HFN of the fourth cell is acquired during a process of performing synchronization with the fourth cell, and perform encryption and integrity protection for a reconfiguration complete message to be transmitted to the third cell through the HFN of the fourth cell, in response to transmitting the reconfiguration complete message to the third cell.

Alternatively, the apparatus may further include a cell determination module that is configured to determine a fifth cell from the at least two target cells, after initiation of a handover to the third cell and failure of the handover, wherein the fifth cell is in slot synchronization with the fourth cell, and a reestablishment module that is configured to initiate a connection reestablishment to the fifth cell according to the result of the synchronization with the fourth cell.

Figure 11:
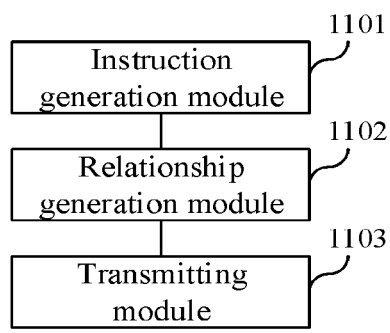
FIG. 11 illustrates a block diagram of an apparatus for cell handover according to an exemplary embodiment.

FIG. 11 illustrates a block diagram of an apparatus for cell handover according to an exemplary embodiment. As shown in FIG. 11, the apparatus for cell handover may be implemented as all or part of the terminal in the implementation environment shown in FIG. 1 through hardware or a combination of software and hardware, so as to perform the steps executed by the base station in any of the embodiments shown in FIG. 5, FIG. 6 or FIG. 8. The apparatus for cell handover may include an instruction generation module 1101 that is configured to generate a handover command, wherein the handover command is configured to instruct a terminal to perform a handover to one of at least two target cells, a relationship generation module 1102 that is configured to generate a timing sequence relationship, wherein the timing sequence relationship is configured to indicate whether any two cells of the at least two target cells are in slot synchronization with each other, wherein the slot synchronization indicates that time-domain resources for synchronization signals for the two cells are the same, and a transmitting module 1103 that is configured to transmit the handover command and the timing sequence relationship to the terminal.

Alternatively, the relationship generation module 1102 may be further configured to acquire time-domain resource offset information of each of the at least two target cells, wherein for each of the at least two target cells, the time-domain resource offset information is configured to indicate a time-domain offset value between time-domain resource for the target cell and time-domain resource for the cell accessed by the terminal currently, and generate the timing sequence relationship according to the time-domain resource offset information of the each of the at least two target cells.

Alternatively, the timing sequence relationship is further configured to indicate whether any two cells of the at least two target cells have a same hyper frame number (HFN).

A system for cell handover is also provided by an exemplary embodiment of the present disclosure, the system includes a terminal and a base station. Herein, the terminal includes the apparatus for cell handover as shown in FIG. 9, and the base station includes the apparatus for cell handover as shown in FIG. 11. Or, the terminal includes the apparatus for cell handover as shown in FIG. 10, and the base station includes the apparatus for cell handover as shown in FIG. 11.

It should be noted that, when the apparatus provided by the foregoing embodiment implements its function, only the division of the foregoing functional modules is used for illustration. In practical applications, the above functions can be allocated by different functional modules according to the actual needs. That is, the content structure of the apparatus is divided into different functional modules to complete all or part of the functions described above.

Regarding the apparatus in the foregoing embodiments, the specific operation mode of each module has been described in detail in the embodiment of the method, and detailed description will not be given here.

An apparatus for cell handover is also provided by an exemplary embodiment of the present disclosure, which may implement all or part of the steps performed by the terminal in the embodiment shown in FIG. 3 or FIG. 6. The apparatus for cell handover may include a processor and a memory for storing a computer program executable by the processor.

The processor may be configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, and the time slot synchronization indicates that time-domain resources for synchronization signals for the two cells are the same. The processor may be further configured to perform synchronization with a first cell of the at least two target cells, determine a second cell from the at least two target cells, in response to initiation of a handover to the first cell according to a result of the synchronization with the first cell and failure of the handover, wherein the second cell is in slot synchronization with the first cell, and initiate a connection reestablishment to the second cell according to the result of the synchronization with the first cell.

An apparatus for cell handover is also provided by an exemplary embodiment of the present disclosure, which may implement all or part of the steps performed by the terminal in the embodiment shown in FIG. 4 or FIG. 8. The apparatus for cell handover may include: a processor and a memory for storing a computer program executable by the processor.

Herein, the processor may be configured to receive a handover command and a timing sequence relationship from a base station, wherein the handover command is configured to instruct the terminal to perform a handover to one of at least two target cells, and the timing sequence relationship is configured to indicate whether any two cells of the at least two target cells are in slot synchronization with each other, wherein the time slot synchronization indicates that time-domain resources for synchronization signals for the two cells are the same. The processor can be further configured to, for each set of cells in slot synchronization with each other among the at least two target cells, select a respective cell from the set of cells in slot synchronization as a synchronization cell, perform synchronization with each of the selected synchronization cell, acquire a result of the synchronization with a fourth cell, when initiating a handover to a third cell of the at least two target cells, wherein the fourth cell is a synchronization cell in slot synchronization with the third cell, and initiate the handover to the third cell according to the result of the synchronization with the fourth cell.

An apparatus for cell handover is also provided by an exemplary embodiment of the present disclosure, which may realize all or part of the steps performed by the terminal in the embodiment shown in FIG. 5, FIG. 6 or FIG. 8. The apparatus for cell handover may include: a processor and a memory for storing a computer program executable by the processor.

Herein, the processor may be configured to generate a handover command, wherein the handover command is configured to instruct a terminal to perform a handover to one of at least two target cells, generate a timing sequence relationship, wherein the timing sequence relationship is configured to indicate whether any two cells of the at least two target cells are in slot synchronization with each other, wherein the slot synchronization indicates that time-domain resources for synchronization signals for the two cells are the same, and transmit the handover command and the timing sequence relationship to the terminal.

The foregoing mainly takes terminals and base stations as examples to introduce the solutions provided by the embodiments of the present disclosure. It can be understood that, in order to implement the above-mentioned functions, the terminal and the base station include hardware structures and/or software modules corresponding to each function. In combination with the modules and algorithm steps of the examples described in the embodiments disclosed in the present disclosure, the embodiments of the present disclosure can be implemented in the form of hardware or a combination of hardware and computer software. Whether a function is implemented by hardware or computer software-driven hardware depends on the specific application and design constraints of the technical solution. Those skilled in the art may use different methods for each specific application to implement the described functions, but such implementation should not be considered as going beyond the scope of the technical solutions of the embodiments of the present disclosure.

Figure 12:
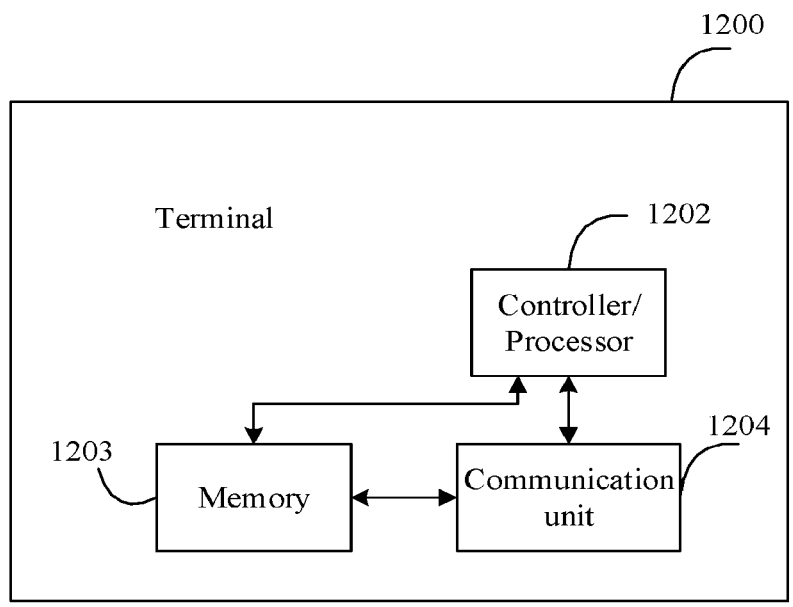
FIG. 12 illustrates a schematic structural diagram of a terminal according to an exemplary embodiment.

FIG. 12 illustrates a schematic structural diagram of a terminal according to an exemplary embodiment.

The terminal 1200 may include a communication unit 1204 and a processor 1202. The processor 1202 may also be a controller, which is represented as "controller/processor 1202" in FIG. 12. The communication unit 1204 is configured to support the communication between the terminal and other network devices (such as a base station). Further, the terminal 1200 may further include a memory 1203, and the memory 1203 is configured to store program codes and data of the terminal 1200.

It can be understood that FIG. 12 only illustrates a simplified design of the terminal 1200. In practical applications, the terminal 1200 may include any number of processors, controllers, memories, communication units, and the like, and all terminals that can implement the embodiments of the present disclosure are within the protection scope of the embodiments of the present disclosure.

Figure 13:
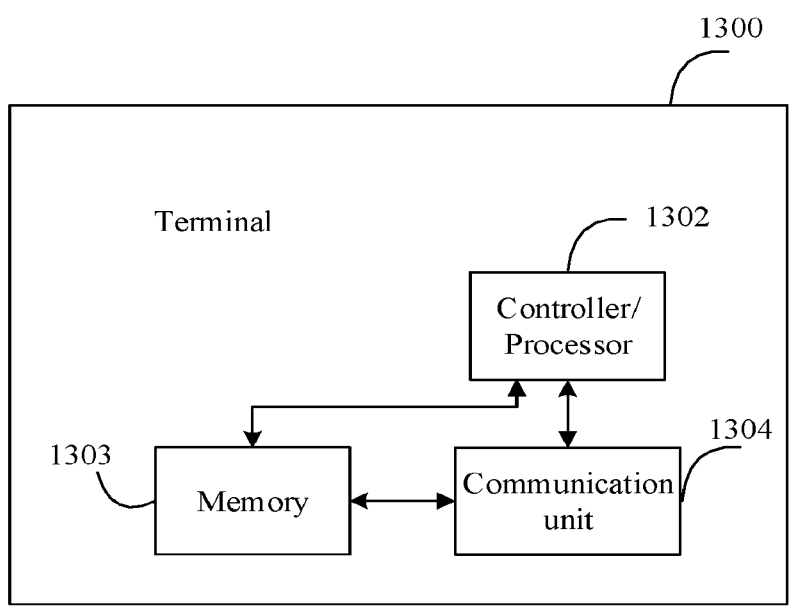
FIG. 13 illustrates a schematic structural diagram of a base station according to an exemplary embodiment.

FIG. 13 illustrates a schematic structural diagram of a base station according to an exemplary embodiment. The base station 1300 may include a communication unit 1304 and a processor 1302. The processor 1302 may also be a controller, which is represented as "controller/processor 1302" in FIG. 13. The communication unit 1304 is configured to support communication between the base station and other network devices (such as, a terminal, other base stations, or a gateway). Further, the base station 1300 may further include a memory 1303, and the memory 1303 is configured to store program codes and data of the base station 1300.

It can be understood that FIG. 13 only illustrates a simplified design of the base station 1300. In practical applications, the base station 1300 may include any number of processors, controllers, memories, communication units, and the like, and all terminals that can implement the embodiments of the present disclosure are within the protection scope of the embodiments of the present disclosure.

Those skilled in the art should be aware that in one or more of the foregoing examples, the functions described in the embodiments of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates the transfer of a computer program from one place to another. The storage medium may be any available medium that can be accessed by a general-purpose or special-purpose computer.

The embodiments of the present disclosure also provide a computer storage medium for storing computer software instructions used for the aforementioned terminal or base station, which includes a program designed for executing the aforementioned method for cell handover.

Other embodiments of the invention will be apparent to those skilled in the art from consideration of the specification and practice of the invention disclosed here. This application is intended to cover any variations, uses, or adaptations of the invention. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for cell handover that is executed by a terminal, the method comprising:
receiving a handover command and a timing sequence relationship from a base station, the handover command being configured to instruct the terminal to perform a handover to one of at least two target cells, and the timing sequence relationship being configured to indicate whether any two cells of the at least two target cells are in slot synchronization with each other so that time-domain resources for synchronization signals for the two cells are the same;
performing synchronization with a first cell of the at least two target cells;

initiating a handover to the first cell based on a result of the synchronization with the first cell;
determining whether a failure of the handover to the first cell occurs;
determining a second cell from the at least two target cells, in response to the failure of the handover to the first cell, the second cell being in slot synchronization with the first cell; and
initiating a connection reestablishment to the second cell based on the result of the synchronization with the first cell;
wherein the timing sequence relationship is further configured to indicate whether any two cells of the at least two target cells have a same hyper frame number (HFN), and
the initiating the connection reestablishment to the second cell based on the result of the synchronization with the first cell further comprises:
acquiring an IIFN of the first cell, in response to the timing sequence relationship indicating that the IIFN of the first cell and an HFN of the second cell are the same, the HFN of the first cell being acquired during a process of performing the synchronization with the first cell; and
performing encryption and integrity protection for a reconfiguration complete message through the HFN of the first cell while transmitting the reconfiguration complete message to the second cell.

2. The method of claim 1, wherein the determining the second cell from the at least two target cells, further comprises:
acquiring a set of candidate cells based on the timing sequence relationship, the set of candidate cells including one or more cells of the at least two target cells, which are in slot synchronization with the first cell, and to which the terminal has not yet initiated a connection reestablishment; and
determining the second cell from the set of candidate cells based on a predetermined selection rule when the set of candidate cells has at least two cells.

3. The method of claim 2, wherein the determining the second cell from the set of candidate cells based on the predetermined selection rule further comprises determining a cell:
randomly from the set of candidate cells as the second cell with a strongest signal strength among the set of candidate cells as the second cell; or
supporting a service type as the same as that corresponding to the terminal among the set of candidate cells as the second cell.

4. The method of claim 1, wherein the initiating the connection reestablishment to the second cell based on the result of the synchronization with the first cell further comprises:
performing signal measurement on the second cell to acquire a signal measurement result, the signal measurement result including at least one of a reference signal receiving power (RSRP) or a reference signal receiving quality (RSRQ); and
initiating the connection reestablishment to the second cell based on the result of the synchronization with the first cell when the signal measurement result is above a predetermined measurement result threshold.

5. A terminal, comprising:
a processor; and
a memory for storing a computer program executable by the processor,
wherein the processor is configured to perform the method of claim 1.

6. The terminal of claim 5, wherein in determining the second cell from the at least two target cells, the processor is further configured to:
acquire a set of candidate cells based on the timing sequence relationship, the set of candidate cells including one or more cells of the at least two target cells which are in slot synchronization with the first cell and to which the terminal has not yet initiated the connection reestablishment; and
determine the second cell from the set of candidate cells based on a predetermined selection rule when the set of candidate cells has at least two cells.

7. The terminal of claim 6, wherein in determining the second cell from the set of candidate cells based on the predetermined selection rule, the processor is further configured to determine a cell:
from the set of candidate cells as the second cell randomly;
with a strongest signal strength among the set of candidate cells as the second cell; or
supporting a service type as the same as that corresponding to the terminal among the set of candidate cells as the second cell.

8. The terminal of claim 5, wherein in initiating the connection reestablishment to the second cell based on the result of the synchronization with the first cell, the processor is further configured to:
perform signal measurement on the second cell to acquire a signal measurement result, the signal measurement result including at least one of a reference signal receiving power (RSRP) or a reference signal receiving quality (RSRQ); and
initiate the connection reestablishment to the second cell based on the result of the synchronization with the first cell when the signal measurement result is above a predetermined measurement result threshold.

9. A method for cell handover that is executed by a terminal, the method comprising:
receiving a handover command and a timing sequence relationship from a base station, the handover command being configured to instruct the terminal to perform a handover to one of at least two target cells, and the timing sequence relationship being configured to indicate whether any two cells of the at least two target cells are in slot synchronization with each other indicating that time-domain resources for synchronization signals for the two cells are the same;
for each set of cells in slot synchronization with each other among the at least two target cells, selecting a respective cell from the set of cells as a synchronization cell;
performing synchronization with each of the selected synchronization cell;
acquiring a result of the synchronization with a fourth cell, when initiating a handover to a third cell of the at least two target cells, the fourth cell being a synchronization cell in slot synchronization with the third cell; and
initiating the handover to the third cell based on the result of the synchronization with the fourth cell;
wherein the timing sequence relationship is further configured to indicate whether any two cells of the at least two target cells have a same HFN; and the initiating the handover to the third cell based on the result of the synchronization with the fourth cell further comprises:

acquiring an HFN of the fourth cell when the timing sequence relationship indicates that an HFN of the third cell and the HFN of the fourth cell are the same, the HFN of the fourth cell being acquired during a process of performing synchronization with the fourth cell; and performing encryption and integrity protection for a reconfiguration complete message through the HFN of the fourth cell when transmitting the reconfiguration complete message to the third cell.

10. The method of claim 9, further comprising:

determining a fifth cell from the at least two target cells, after initiation of a handover to the third cell and failure of the handover, the fifth cell being in slot synchronization with the fourth cell; and initiating a connection reestablishment to the fifth cell based on the result of the synchronization with the fourth cell.

11. A terminal, comprising:

a processor; and a memory for storing a computer program executable by the processor, wherein the processor is configured to perform the method of claim 6.

12. The terminal of claim 11, wherein the processor is further configured to:

determine a fifth cell from the at least two target cells after initiation of a handover to the third cell and failure of the handover, the fifth cell being in slot synchronization with the fourth cell; and initiate a connection reestablishment to the fifth cell based on the result of the synchronization with the fourth cell.

* * * * *